Patented Feb. 22, 1938

2,109,369

UNITED STATES PATENT OFFICE 2,109,369

DYESTUFF OF THE INDIGOID TYPE

Samuel Ellingworth, Blackley, Manchester, England, assignor to Imperial Chemical Industries Limited, a corporation of Great Britain No Drawing. Application September 11, 1935, Serial No. 40,092

1 Claim. (Cl. 260—48)

This invention relates to the preparation of new dyestuffs of the indigoid type. More particularly, the invention comprises the production of new dyestuffs of the following general formula

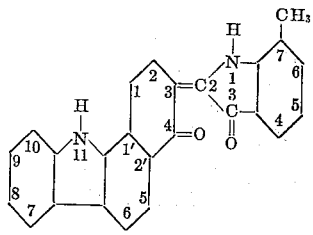

wherein the hydrogens in the 4, 5 and 6 positions of the isatin radical may be substituted by halogen or methyl groups and the hydrogens in the 7, 8, 9, 10 and 11 positions of the benzocarbazole radical may be substituted by a methyl group, and which may be prepared by condensing a 4-hydroxy-1',2'-benzocarbazole with an orthomethyl-alpha-isatin compound. Since the numbering of the intermediates used in the preparation of the compounds above identified is not uniform in the literature, the numbering found above for the benzocarbazole and the orthomethyl-alpha-isatin radicals will be used in this patent.

While the prior art discloses the preparation of dyestuffs by condensing 4-hydroxy-1',2'-benzocarbazoles with isatin anilides or halogen-isatin anilides (see for instance German Patent 241,997, and U. S. Patents 1,108,056, 1,157,485 and 1,706,902) the compounds of the series which are dark blue or black in shade suffer from the defect of changing quite noticeably on soaping. The compound obtainable according to German Patent 241,997 from the unsubstituted oxynaphthocarbazole and isatin anilide, while it dyes in black shades from a hydrosulfite vat, turns to dark brown on soaping. Those compounds prepared according to U. S. Patent 1,157,485 containing chlorine in the isatin radical which are black on original dying turn to a distinctly blackish-green on soaping; while those containing a methyl group in the carbazole radical, according to U. S. Patent 1,706,902, which dye black in the original vat change to a blue-black on soaping.

I have found that black dyestuffs can be produced by condensing 4-hydroxy-1',2'-naphthocarbazole with an ortho-methyl substituted isatin compound which may or may not be further substituted by halogen or methyl groups in the Bz ring of the isatin or in the benzocarbazole radical, which have superior properties to those heretofore described. These new colors, which are exceedingly fast to light, give deeper shades of black when dyed or printed in heavy shades and more neutral grays when printed or dyed in light shades than the corresponding compounds that contain no methyl group in the 7 (or ortho) position of the isatin radical.

The following examples are given to more fully illustrate the preferred method of preparing these new color compounds. Parts used are by weight.

Example 1

23.3 parts of 4-hydroxy-1',2'-benzocarbazole and 27.8 parts of 5,7-dimethyl-alpha-isatin-xylidide are dissolved in 400 parts of acetic anhydride and heated at 50–60° C. for a few hours until the alpha-isatin derivative has completely disappeared. The mass is cooled and the heavy black crystalline material is filtered off, washed with acetic anhydride and alcohol. The dyestuff so obtained forms a yellow vat with alkaline hydrosulfite from which cotton is dyed in neutral gray to black shades. The product has the following general formula

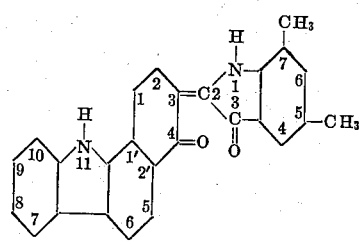

Example 2

23.3 parts of 4-hydroxy-1',2'-benzocarbazole and 25 parts of 7-methyl-alpha-isatin-o-toluidide are dissolved in 150 parts of toluene. 110 parts of acetic anhydride are added and the temperature held for 10 hours at 40° C. The reaction mass is cooled to 25° and the black crystalline material filtered and washed with toluene. After drying and milling, the paste can be incorporated in a printing gum and when printed on cotton or regenerated cellulose gives neutral gray shades in weak prints and heavy bright black shades in strong prints. The product has the following general formula

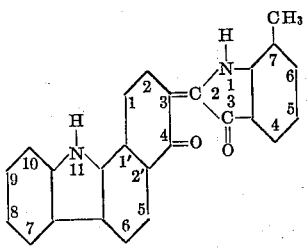

The 4-hydroxy-benzocarbazole may contain alkyl groups in the 7, 8, 9, 10 or 11 positions, and these compounds may be prepared by any of the known methods (see for instance Journal für Praktische Chemie, 1910 (2), vol. 81, page 25). In preparing the methyl substituted carbazole compounds, meta- or para-xylidine, ortho-, meta- or para-toluidines, etc., may be used as the hydrazine component, condensing these compounds with the alpha-naphthylamine compound which contains a hydroxy or sulfonic acid group in the 5 position. When the naphthylamine sulfonic acid is used, the benzocarbazole sulfonic acid is usually fused with caustic alkalies to produce the corresponding hydroxy-benzocarbazole.

The alpha-isatin-anilide compounds used in this process may be prepared by any of the known methods, such as for instance, the process described by Fierz-David in "Dye Chemistry", 1921, pages 161–165. Ortho-toluidine, the 2,3-, 2,4- or 2,5-dimethyl-anilines or the chloro or bromo substitution products of ortho-toluidine or the xylidines containing no substituent in the 6 position may be used in place of aniline in the Sandmeyer reaction.

The condensation of the 4-hydroxy-benzo-carbazole compound with the 7-methyl-alpha-isatin compound is effected by heating them together in acetic anhydride with or without the addition of glacial acetic acid or other diluent, the heating being continued until the alpha-isatin compound has been consumed. On cooling, the new black dyestuffs crystallize out and may be filtered off.

The dyestuffs of my invention are faster to boiling in soap solutions than any of the known products of this class which do not contain a methyl group in the 7 position of the isatin radical.

The products prepared according to this process may be further halogenated as, for example, by the procedure outlined in German Patent 241,997, thus giving products having the same desirable properties with slight change in shade.

I claim:

The compound of the following formula

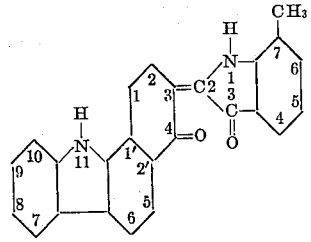

which dyes cotton in from gray to black shades.

SAMUEL ELLINGWORTH.